United States Patent [19]

Tanaka

[11] 3,958,300
[45] May 25, 1976

[54] PLASTIC DEVICE FOR CLAMPING AND HOLDING A LENGTH OF ELECTRIC CORD

[75] Inventor: Toshie Tanaka, Machida, Japan

[73] Assignee: Nifco Inc., Tokyo, Japan

[22] Filed: Oct. 10, 1975

[21] Appl. No.: 621,444

[52] U.S. Cl. ................................. 16/2; 174/153 G; 403/41; 339/103 B; 403/197
[51] Int. Cl.² ........................................ F16L 5/00
[58] Field of Search ............. 339/103 B; 174/65 G, 174/152 G, 153 G, 155, 156; 24/73 AP; 16/2, 108; 248/56; 403/41, 195, 197; 285/162

[56] References Cited
UNITED STATES PATENTS

| | | | |
|---|---|---|---|
| 2,123,122 | 7/1938 | Shaw | 174/156 |
| 2,573,600 | 10/1951 | Pruehs | 174/153 G |
| 2,895,003 | 7/1959 | Rapata | 174/153 G |

Primary Examiner—Andrew V. Kundrat
Attorney, Agent, or Firm—Jack R. Halvorsen; Robert W. Beart

[57] ABSTRACT

Disclosed is a plastic device for clampingly holding a length of electric cord which device comprises two L-shaped halves hinge-connected to each other, each having an L-shaped groove. In use, a length of electric cord is curved in the form of an L, and is fitted in the groove of one half, and then the other half is rotated around the hinge-connection to overlie said half in which the cord has been fitted. The two grooves constitute a complete round hole in which the electric cord is contained in a clamped condition.

With this arrangement the clamp holder according to this invention assures a positive grip of the electric cord against any "pull-out" force applied to the electric cord.

4 Claims, 8 Drawing Figures

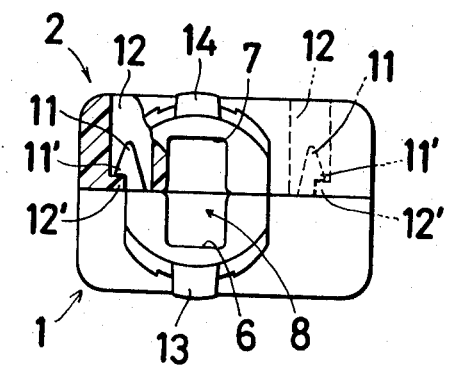
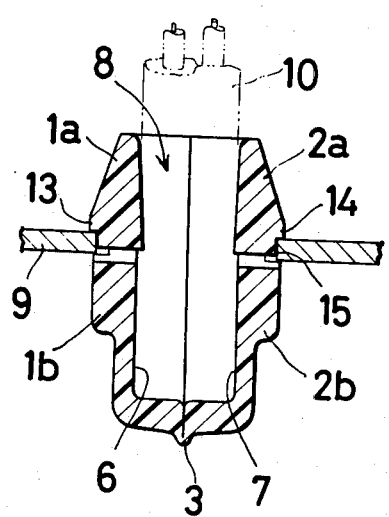
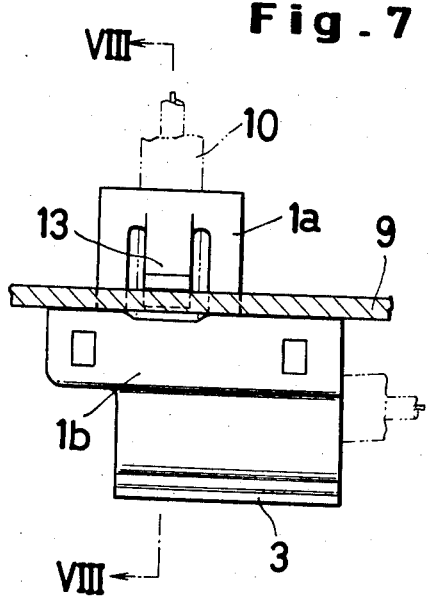

PLASTIC DEVICE FOR CLAMPING AND HOLDING A LENGTH OF ELECTRIC CORD

BACKGROUND OF THE INVENTION

This invention relates to a device for fixing a length of electric cord to an outlet of an electric apparatus, and particularly to such a device which is useful in bending a length of electric cord at a right angle so that it can lie along the outer wall of the electric apparatus.

If a length of electric cord is allowed to extend from an outlet of an electric apparatus without being fixed at the outlet, the electric cord can be moved, and therefore there is a danger that the insulating sheath of the electric cord may be damaged due to the friction and rubbing of the cord against the edge of the outlet.

Still disadvantageously, if a relatively strong pulling force is applied to the cord in such free state, the cord is often disconnected from the electric apparatus. In some instances the conductors of the cord are severed or some parts of the electric apparatus are broken. A rubber or plastic bush has been hitherto used to avoid the accidents mentioned above. Specifically, an annular bush of an insulating material such as a plastic material or rubber is fitted in the outlet of the electric apparatus, and a length of electric cord is inserted in the annular bush for the sake of protection.

However, such bush lacks the capability of gripping the cord. It is often desired that a length of cord be extended in the relatively small space between the undersurface or bottom of the electric apparatus casing and the floor of the room so that the cord is out of sight. In this case, however, the cord is often bent too much as a result of being pushed against the floor. In some instances a length of cord becomes tangled in the small space between the undersurface of the electric apparatus housing and the floor of the room.

This invention was made with a view to overcoming the above defects. Specifically, one object of this invention is to provide an electric cord clamp holder device which is adapted to clamp the cord at the outlet of an electric apparatus, and is useful particularly in extending the cord in the small space between the undersurface or bottom of the electric apparatus housing and the floor of the room. Another object of this invention is to provide such a device which is easy to handle, and is advantageous to massproduction at a minimum cost.

SUMMARY OF THE INVENTION

To attain these and other objects an electric cord clamp holder device according to this invention comprises two L-shaped counterparts hinge-connected to each other along one leg of the L-shaped half blocks, each counterpart having an L-shaped groove on the inner flat surface thereof and a raised catch portion on the outer surface of the other leg of the L-shaped half block.

BRIEF DESCRIPTION OF THE DRAWINGS

This invention will be better understood from the following description of a preferred embodiment which is shown in the accompanying drawings:

FIG. 5 is an end view of the holder device in the closed state, partly broken away.

FIG. 7 shows the position in which the holder device is fitted in an outlet of an electrical apparatus.

FIG. 8 is a sectional view of the holder device taken along the line VIII—VIII of FIG. 7.

DETAILED DESCRIPTION OF THE INVENTION

Figure 1:
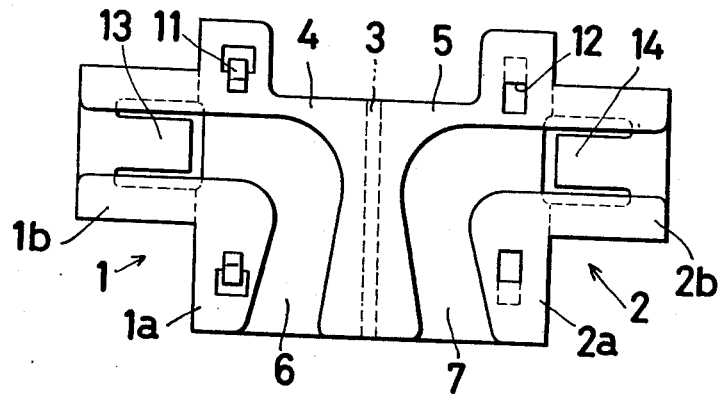
FIG. 1 is a plane view of one embodiment according to this invention in the opened state.

Referring to the drawings, there is shown an electric cord clamp holder according to this invention. This holder device is composed of a single piece of molded plastic comprising two halves 1 and 2 hinge-connected to each other. Each half of the device is generally shaped in the form of an L, and one leg 1a of one L-shaped half is hinge-connected to one leg 2a of the other L-shaped half by a thin "hinge" strip portion 3, thus allowing the two halves to open and close. The planes 4 and 5 of these two halves 1 and 2 to be put on each other are flat, and L-shaped grooves 6 and 7 are made on the flat planes 4 and 5 of the halves 1 and 2 in parallel relation with the L-shaped contour of the half counterpart. When the two counterparts are put into the closed position, the L-shaped grooves will constitute a hole 8 in the integrated block. This hole 8 is used to receive a length of electric cord 10 extending from an electric apparatus 9, as described later in detail.

The depth of the each L-shaped groove 6 or 7 is determined in connection with the diameter of the electric cord 10 to pass therethrough. Specifically, the depth of the L-shaped groove is equal to the diameter of the electric cord or is somewhat smaller than the diameter of the electric cord. Thus, the electric cord is curved and fitted in the groove of one counterpart, and the other counterpart is put on the one counterpart, and the electric cord is tightly fitted in the hole 8 thus made from the two opposite grooves. As shown, the L-shaped grooves are made at a bending angle somewhat smaller than 90°, thus increasing the friction to resist, pull and prevent the cord from slipping out of the device when the cord is subjected to a pulling force. This and the clamping effect together assure the positive grip and hold of the electric cord in the clamp holder device, and the cord cannot be moved in the device. The flat and extensive plane of one counterpart has a nail 11 at a place other than the L-shaped groove, whereas the flat plane of the other counterpart has a catch hole 12 at a corresponding place thereon. When the two counterparts are rotated around the hinge and are closed, the nail will be caught by the associated catch hole, thus putting these counterparts in a closed and reopenable state. It is not absolutely necessary to provide the nail and catch hole on the flat planes of the two halves. But, they are useful in keeping the counterparts in the closed state, and therefore the nail-and-catch means makes it easy to handle the clamp holder device after the electric cord has been clamped therein, as for instance in fitting the device in the receptacle hole of an electric apparatus. Thus, working ease is accordingly improved. The projection 1b of one half 1 and the projection 2b of the other half 2 if put in the integrated position, will constitute a tapering male portion of the clamp-holder device, which is fitted in a female hole 15 of an electric apparatus 9 to hold the whole device in a proper position. The projections 1b and 2b respectively have catches 13 and 14 on the surfaces thereof. These catches 13 and 14 may be made by cutting the bottom of the groove in the form of a tongue and by somewhat raising the piece to project above the outside surface of the male projection. The catch or tongue piece is raised above the surface level of the male projection, and when the male projection of the clamp holder device is inserted in a female hole 15 of an electric apparatus 9, the tongue piece is yieldingly lowered to the same level as the surface of the male projection, and when the male projection is completely fitted in the female hole, the tongues again rise because of their resilient nature to catch the circumferential edge of the female hole, thus positively fixing the whole device in the electric apparatus.

With this arrangement, an electric cord clamp holder device according to this invention is easy to handle, and assuredly prevents the electric cord from being pulled out. Specifically, the electric cord is curved in the form of the letter L, and is clampingly held in the L-shaped hole, and therefore if a pulling force is applied to the electric cord, the cord will not slip out of the hole of the device, and at the same time the pulling will not exert a force on the point at which the conductors of the electric cord are connected to the electric apparatus. As mentioned above, the electric cord clamp holder device according to this invention is fitted in a female hole of an electric apparatus by inserting the male projection of the device into the female hole of the electric apparatus and by allowing the tongue pieces of the male projection to catch the circumferential edge of the female hole. Therefore, once the device has been fixed to the electric apparatus, the device cannot be reopened to release the electric cord before the device is removed from the electric apparatus. Thus, there is no danger of the electric cord being released by accident.

Figure 6:
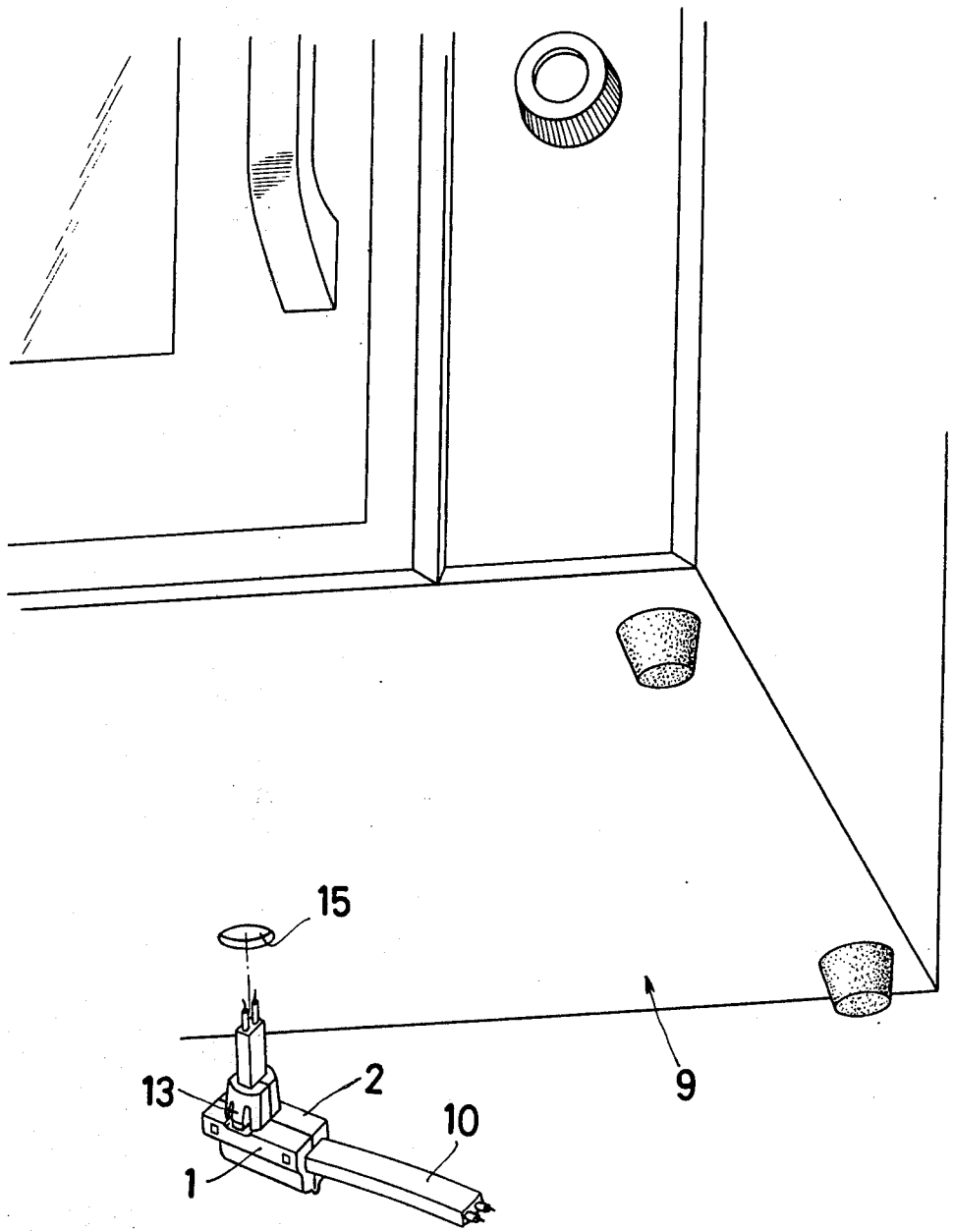
FIG. 6 shows the manner in which the holder device is fitted in an outlet of an electrical apparatus.

The cord clamp holder according to this invention bends the electric cord by 90° so that it can extend along the outer surface of the electric apparatus. Thus, a length of electric cord may be pulled out from the bottom of the electric apparatus, and may be extended in the small space between the bottom of the electric apparatus and the floor of the room, as shown in FIG. 6.

Figure 2:
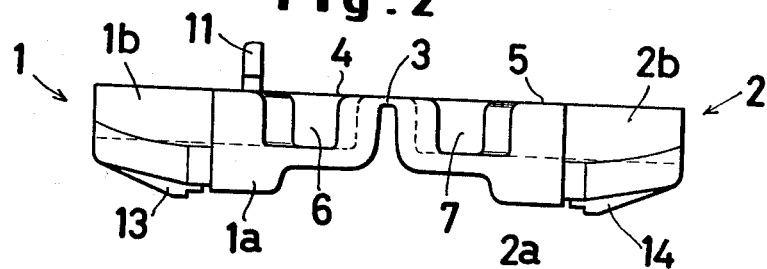
FIG. 2 is a side view of the holder device of FIG. 1.
Figure 4:
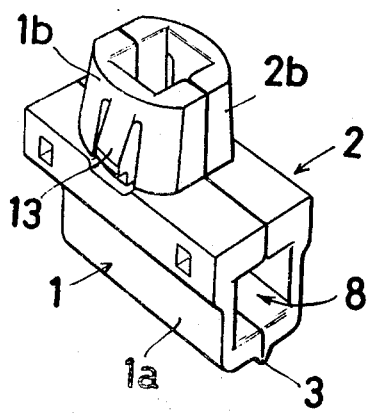
FIG. 4 is a perspective view of the holder device in the closed state.
Figure 3:
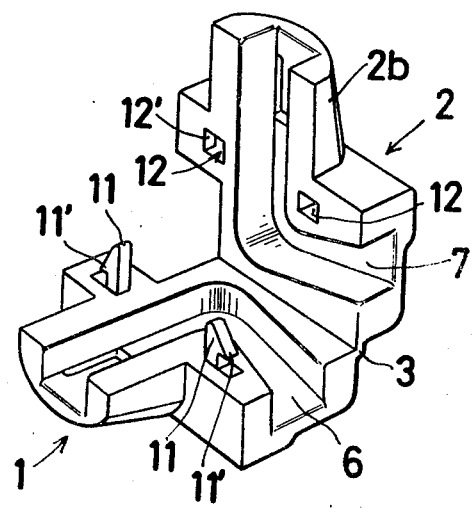
FIG. 3 is a perspective view of the holder device with its two counterparts bent toward each other at right angles.

An electric cord clamp holder device according to this invention can be plastic-molded in the developed form as shown in FIGS. 1 and 2, and therefore a single mold is used to make the holder device in an integrated form. This is advantageous to massproduction of the holder device.

A variety modifications of the above embodiments will be obvious to those skilled in the art. As one of such modifications the inner wall of the L-shaped grooves may be indented. The so-indented grooves will enhance the resistance to pull-out of the electric cord in use.

What is claimed is:

1. A plastic device for clamping and holding a length of electric cord comprising two L-shaped counterparts hinge-connected to each other along one leg of the L-shaped counterparts, each counterpart having an L-shaped groove on the inner flat surface thereof and a raised catch portion of the outer surface of the other leg of the L-shaped counterpart.

2. A plastic clamp holder according to claim 1 wherein one of the counterparts has at least one nail projection on the inner flat surface thereof and the other counterpart has at least one catch hole on the inner flat surface thereof, whereby the two halves are kept closed in a reopenable way.

3. A plastic clamp holder device according to claim 1 wherein said L-shaped groove has indentations in the inner surface thereof.

4. A plastic clamp holder device according to claim 1 wherein one of said counterparts has at least one male projection on the inner flat surface whereas the other counterpart has at least one female hole on the inner flat surface whereby said counterparts once closed will be kept closed in a reopenable way by allowing the at least one female member to catch the at least one male member.

* * * * *